United States Patent
Lee et al.

(10) Patent No.: US 7,840,369 B2
(45) Date of Patent: Nov. 23, 2010

(54) APPARATUS AND METHOD FOR CORRECTING BIAS OF GYROSCOPE MOUNTED ON MOBILE ROBOT

(75) Inventors: Hyoung-ki Lee, Seongnam-si (KR); Ki-wan Choi, Anyang-si (KR); Dong-yoon Kim, Yongin-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 669 days.

(21) Appl. No.: 11/822,405

(22) Filed: Jul. 5, 2007

(65) Prior Publication Data
US 2008/0022790 A1  Jan. 31, 2008

(30) Foreign Application Priority Data
Jul. 5, 2006  (KR) ...................... 10-2006-0063154

(51) Int. Cl.
*G01C 19/54* (2006.01)
(52) U.S. Cl. .................... 702/145; 702/96; 702/141; 702/142; 702/146; 702/150; 702/151; 702/179; 73/504.12; 901/1; 901/47; 700/254; 74/5.4
(58) Field of Classification Search .................. 702/96, 702/141, 142, 145, 146, 150, 151, 179; 73/504.12; 700/254; 901/1, 47; 74/5.4
See application file for complete search history.

(56) References Cited

FOREIGN PATENT DOCUMENTS

| | | |
|---|---|---|
| EP | 0 685 705 A1 * | 6/1995 |
| EP | 0 685 705 | 12/1995 |
| JP | 62-254212 | 11/1987 |
| JP | 4-235310 | 8/1992 |
| JP | 8-95638 | 4/1996 |
| JP | 10-55215 | 2/1998 |
| JP | 2874348 | 1/1999 |
| KR | 10-2004-0062038 | 7/2004 |
| KR | 1020060032880 | * 10/2004 |
| KR | 10-0560966 | 3/2006 |
| KR | 10-2006-0032880 | 4/2006 |

OTHER PUBLICATIONS

Yafei et al. "MEMS Gyroscope Performance Based on Allan Variance." 2007, from IEEE Xplore.*
Korean Patent Office Action, mailed Sep. 5, 2007 and issued in corresponding Korean Patent Application No. 10-2006-0063154.

* cited by examiner

*Primary Examiner*—Sujoy K Kundu
(74) *Attorney, Agent, or Firm*—Staas & Halsey LLP

(57) ABSTRACT

An apparatus correcting a bias of a gyroscope that is mounted on a mobile robot and that measures an angular velocity of the mobile robot. The apparatus includes: at least one encoder respectively measuring a traveling velocity of a respective at least one wheel of the mobile robot; a modeling unit calculating an angular velocity of the mobile robot by using the measured traveling velocity; a bias presuming unit determining a confidence range by using difference values between the calculated angular velocity and the measured angular velocity, and calculating a presumed bias by using a value in a confidence range among the difference values; and a bias removing unit removing the presumed bias from the measured angular velocity.

28 Claims, 10 Drawing Sheets

US 7,840,369 B2

APPARATUS AND METHOD FOR CORRECTING BIAS OF GYROSCOPE MOUNTED ON MOBILE ROBOT

CROSS-REFERENCE TO RELATED APPLICATION

This application claims priority from Korean Patent Application No. 10-2006-0063154 filed on Jul. 5, 2006 in the Korean Intellectual Property Office, the disclosure of which is incorporated herein by reference.

BACKGROUND

1. Field

The present invention relates to a mobile robot, and more particularly, to an apparatus and method that corrects an offset value of a gyroscope to correct direction errors of a mobile robot.

2. Description of Related Art

One of the most basic and important functions of a mobile robot, such as a cleaning robot, is position detection. A method using a GPS (Global Positioning System) has been used to determine an absolute position of such a mobile robot. Also, a method in which linear and rotation velocities are measured by an encoder and integrated to determine the position of the mobile robot, a method in which the position of the mobile robot is determined using characteristics of walls and ceilings detected by cameras, a method in which an acceleration detected by an acceleration sensor is integrated twice so as to determine X- and Y-coordinates, and a method in which a rotation velocity, that is, output of a gyro sensor is integrated to determine the direction are known for determining a relative position of the mobile robot.

Each of the aforementioned methods has drawbacks. In the case of determining rotation direction, if GPS is used, it is advantageous to determine the absolute position. However, since GPS is not accurate in a confined space such as an inner space of a building, it is not practical to use GPS in a building. Further, even though the encoder is low cost, rotation errors occur due to floor conditions, assemble errors, and slip, for example.

A gyro sensor is a device for measuring angular velocity. Once the measured angular velocity is integrated over time, it is possible to obtain the azimuth of the robot. When the position of the mobile robot is calculated, the mobile robot can have excellent resistance against environment and can be stand-alone due to the gyro sensor. The gyro sensor for measuring the rotation velocity does not generate errors caused by the floor conditions, impacts from the outside, and collision against objects like an encoder does. However, since the direction errors are accumulated due to offsets of the output of the gyro sensor, it is necessary to correct the offset value that is changed as time goes by.

Gyro sensors are subject to what is called "bias drift." That is, when the mobile robot is stopped, the signal level of the gyroscope is changed due to direction errors that arise over time. A gyro sensor having a low bias drift tends to be expensive. For this reason, since a mobile robot in which an inexpensive gyro sensor is used has a large bias drift, it is necessary to correct an offset value.

Korean Patent Application Publication No. 2004-62038 entitled "GYRO OFFSET COMPENSATION METHOD OF ROBOT CLEANER" discusses offset correction. According to the robot cleaner of this publication, when it is in a gyro offset correct mode, the robot cleaner is stopped for a predetermined time and gyro offsets are collected. Then, an average and standard deviation is calculated by using the collected gyro offsets to calculate a new gyros offset by averaging the values from which gyro offsets corresponding to noises are stochastically excluded. As a result, it is possible to correct direction error of the gyro sensor.

When it is determined that the robot is stopped, gyroscope signals are inputted to the robot and signals corresponding to noises are removed from the gyroscope signals. An average of the rest of the signals is used as a reference bias value, and an angle calculated on the basis of a previous bias is corrected using the new bias value.

When the mobile robot is stopped, it is possible to obtain the most accurate bias offset. Accordingly, the above-mentioned Korean patent application publication is useful. However, the mobile robot needs stop to measure the bias offset. Since rapid movements for quick cleaning is important in a mobile robot such as a cleaning robot, frequent stops may cause the cleaning efficiency to be decreased.

SUMMARY

An aspect of the present invention provides an apparatus and method for correcting the bias of a gyroscope mounted on a mobile robot in real-time during the movement of the mobile robot.

According to an aspect of the invention, there is provided an apparatus correcting a bias of a gyroscope that is mounted on a mobile robot and that measures an angular velocity of the mobile robot. The apparatus includes: at least one encoder respectively measuring a traveling velocity of a respective at least one wheel of the mobile robot; a modeling unit calculating an angular velocity of the mobile robot by using the measured traveling velocity; a bias presuming unit determining a confidence range by using difference values between the calculated angular velocity and the measured angular velocity, and calculating a presumed bias by using a value in a confidence range among the difference values; and a bias removing unit removing the presumed bias from the measured angular velocity.

According to another aspect of the invention, there is provided a method of correcting a bias of a gyroscope that is mounted on a mobile robot and that measures an angular velocity of the mobile robot, the method including: measuring a traveling velocity of at least one respective wheel of the mobile robot; calculating an angular velocity of the mobile robot by using the measured at least one traveling velocity; determining a confidence range by using difference values between the calculated angular velocity and the measured angular velocity; calculating a presumed bias by using a value in a confidence range among the difference values; and removing the presumed bias from the measured angular velocity.

According to another aspect of the invention, there is provided an apparatus correcting an offset value of a gyroscope of a mobile robot in real-time during movement of the mobile robot, the apparatus including: a modeling unit calculating a calculated angular velocity of the mobile robot using a measured traveling velocity of each wheel of the mobile robot; a bias removing unit correcting for a bias offset in a measured angular velocity of the mobile robot measured by the gyroscope, the bias removing unit generating a corrected measured angular velocity by removing a presumed bias from the measured angular velocity; and a bias presuming unit calculating the presumed bias value using a confidence range in which a difference between the calculated angular velocity and corrected measured angular velocity is less than a threshold, the confidence range determined using difference values between the calculated angular velocity and the measured angular velocity.

According to still another aspect of the present invention, there is provided a method of compensating, in real-time, for bias drift of a gyroscope mounted in a mobile robot, during the movement of the mobile robot, the method including: calculating a calculated angular velocity of the mobile robot using a measured traveling velocity of each wheel of the mobile robot; correcting for a bias offset in a measured angular velocity of the mobile robot measured by the gyroscope, the bias removing unit generating a corrected measured angular velocity by removing a presumed bias from the measured angular velocity; and calculating the presumed bias value using a confidence range in which a difference between the calculated angular velocity and corrected measured angular velocity is less than a threshold, the confidence range determined using difference values between the calculated angular velocity and the measured angular velocity.

Additional aspects and/or advantages will be set forth in part in the description which follows and, in part, will be apparent from the description, or may be learned by practice of the invention.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION OF THE EMBODIMENTS

Figure 1:
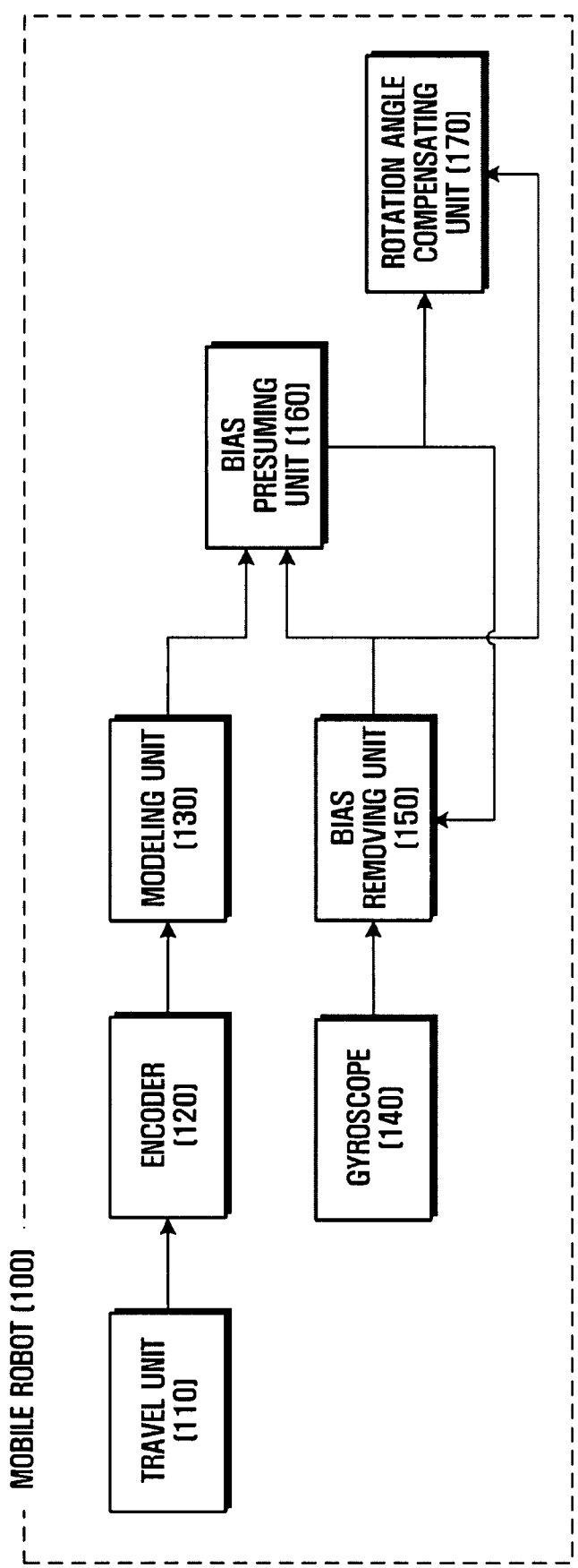
FIG. 1 is a block diagram showing the configuration of a mobile robot according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

As shown in FIG. 1, a mobile robot 100 according to an embodiment of the present invention may include a travel unit 110, an encoder 120, a modeling unit 130, a gyroscope 140, a bias removing unit 150, a bias presuming unit 160, and a rotation angle compensating unit 170.

The travel unit 110 supplies power to the mobile robot 100 so that the mobile robot 100 may move (travel). In general, the travel unit 110 may include a plurality of wheels and a direction control part. However, the travel unit 110 may include other known travel configurations that can move the mobile robot 100.

The encoder 120 detects a rotation velocity of each wheel that is included in the travel unit 110. When the rotation velocity is multiplied by a radius of the wheel, it is possible to calculate a linear velocity (traveling velocity) of the wheel. As a result, it is possible to calculate variations in a position and a direction between the previous position and the present position of the mobile robot 100. The encoder 120 gives an order to the robot so that the position or direction of the robot changes. Further, the encoder 120 is provided to control the movement of the robot when the robot is moved in response to the order. When the encoder 120 is used, the present absolute position of the robot is obtained by integrating the moving distance and direction of the robot. In this case, if an integral error does not occur, it is possible to perform the localization of the robot by using only the encoder 120. The encoder 120 has relatively high accuracy for a short period, like an odometer. However, in the encoder 120, errors accumulate for every error sampling time.

Figure 2:
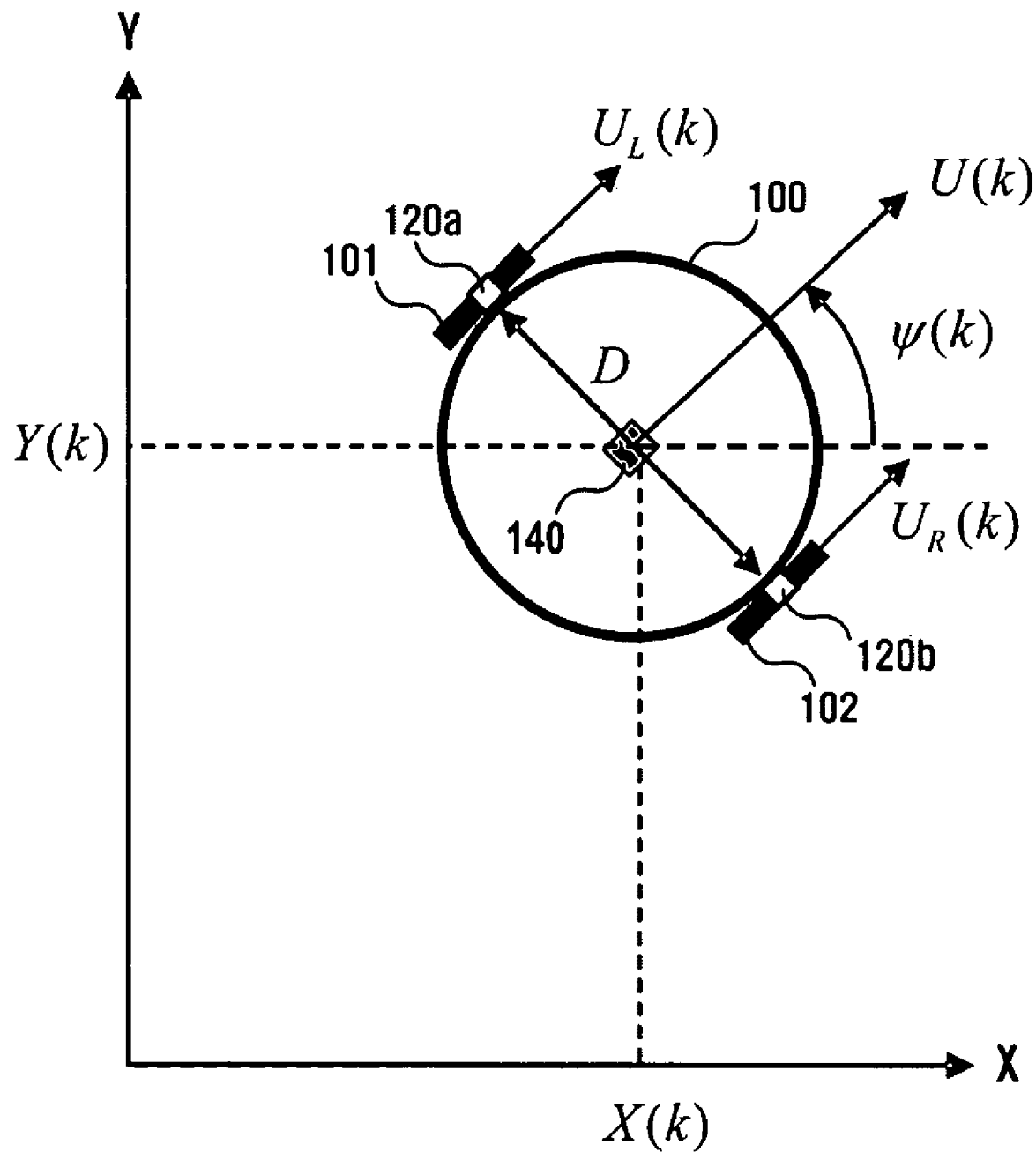
FIG. 2 is a view illustrating a method of modeling an angular velocity of the mobile robot by using a linear velocity of a wheel.

The encoder 120 supplies a linear velocity of each wheel to the modeling unit 130. FIG. 2 is a view illustrating a method of modeling an angular velocity of the mobile robot 100 by using the linear velocity in the modeling unit 130. Two wheels 101 and 102 included in the mobile robot 100 are provided with encoders 120a and 120b, respectively. In FIG. 2, the coordinates of the mobile robot 100 in an absolute coordinate system are indicated as (X(k), Y(k)), the linear velocity of the left wheel 101 is indicated as $U_L(k)$, the linear velocity of the right wheel 102 is indicated as $U_R(k)$, and a distance between the wheels 101 and 102 is indicated as D. In addition, an angle in which the mobile robot 100 rotates from a reference line is indicated as $\psi(k)$, and the linear velocity of the mobile robot 100 is indicated as U(k). In this case, k is an index indicating a point of time when the mobile robot 100 is observed.

The mechanical relationship of the mobile robot 100, which is indicated using the above-mentioned parameters, may be expressed in the following Expression 1:

EXPRESSION 1

$$\overset{*}{X}(k) = X(k+1) - X(k) = \cos\psi_k(k) \times U(k)$$

$$\overset{*}{Y}(k) = Y(k+1) - Y(k) = \sin\psi_k(k) \times U(k)$$

$$\overset{*}{\psi}_k(k) = \psi_k(k+1) - \psi_k(k) = \frac{U_R(k) - U_L(k)}{D}$$

$$U(k) = \frac{U_R(k) + U_L(k)}{2}.$$

When the output velocity values $U_R(k)$ and $U_L(k)$ of the encoder 120 are used in Expression 1, it is possible to obtain a variation ($\dot{X}(k)$) of displacement on an X axis, a variation ($\dot{Y}(k)$) of displacement on an Y axis, and a variation ($\dot{\psi}_R(k)$) of displacement in a rotation angle, between one point of time k and the next point of time k+1. In this case, a subscript k (kinetic) of $\dot{\psi}_k$ means that $\dot{\psi}$ is measured by the encoder.

That is, the modeling unit 130 receives the linear velocities $U_R(k)$ and $U_L(k)$ of the wheel from the encoder 120, and can then calculate the variation (angular velocity) $\dot{\psi}_k(k)$ of displacement in a rotation angle.

Gyroscope 140 is a device that outputs a value (hereinafter, referred to as a gyroscope output value) proportional to the angular velocity of the mobile robot 100 by using the rotational inertia of a mass capable of rotating about one or more axes. The gyroscope 140 may be a uniaxial gyroscope or a multiaxial gyroscope. The gyroscope 140 supplies a gyroscope output value $G_{out}(k)$ to the bias removing unit 150. The gyroscope output value $G_{out}(k)$ is a value when a bias is not corrected, that is, a value in which an offset is included in an actual angular velocity.

Figure 3:
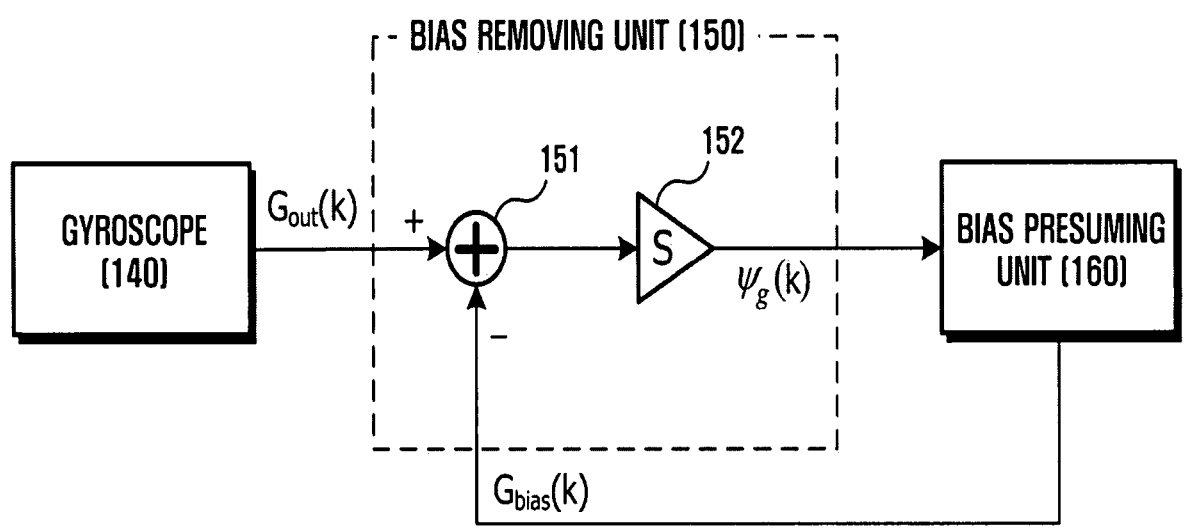
FIG. 3 is a block diagram showing the detailed configuration of a bias removing unit.

Accordingly, the bias removing unit 150 should subtract a bias value $G_{bias}(k)$ presumed by the bias presuming unit 160 from the gyroscope output value $G_{out}(k)$. FIG. 3 is a block diagram showing the detailed configuration of the bias removing unit 150. The bias removing unit 150 may include a subtracter 151 that subtracts the presumed bias value $G_{bias}(k)$ from the gyroscope output value $G_{out}(k)$, and a multiplier 152 that multiplies the subtraction result by a predetermined scale factor S to output a corrected angular velocity $\dot{\psi}_g(k)$. In this case, a subscript g of $\dot{\psi}_g$ means that $\dot{\psi}$ is measured by the gyroscope, and the scale factor S is a constant that is used to perform scaling for converting the scale at the gyroscope output value into an actual angular velocity.

Meanwhile, the rotation angle $\psi(k)$ of the mobile robot 100 can be obtained by integrating the angular velocity $\dot{\psi}_g(k)$ of the gyroscope. Even though the bias value $G_{bias}(k)$ is very small, if the bias value $G_{bias}(k)$ is integrated for a long time, the bias value $G_{bias}(k)$ becomes significantly large. That is, the final azimuth of the robot has an error as large as $$\int_0^t S \cdot G_{bias}(\tau) d\tau.$$

Therefore, it is necessary that an accurate bias offset value be frequently measured so as to compensate the azimuth of the robot.

In related art, an average of bias values measured in a static state before the mobile robot 100 is moved has been generally used as a bias value $G_{bias}(k)$. However, as time goes by or as an ambient temperature is changed, the average is slightly changed, due to bias drift. Since the bias drift is expressed with a probability model, it is not possible to estimate the value thereof. For this reason, it is necessary that the bias drift be frequently compensated on the basis of measured values. The compensation of the bias drift should be frequently performed regardless of the stop or move of the mobile robot 100.

In an ideal case, the rotation angle measured by the encoder 120 is equal to the rotation angle measured by the gyroscope 140 in the mobile robot 100. However, when the mobile robot 110 slips over a floor or the wheels run idle while the robot passes over an obstacle, the rotation angle measured by the encoder 120 is generally different from the rotation angle measured by the gyroscope 140. Therefore, when the difference between the rotation angles is monitored and is smaller than a predetermined value, it is considered that the difference is caused due to the bias drift.

The bias presuming unit 160 calculates a presumed bias value by using a range (hereinafter, referred to as a confidence range) in which the difference (hereinafter, indicated as a) between the angular velocity $\dot{\psi}_k(k)$ supplied from the robot modeling unit 130 and the angular velocity supplied from the bias removing unit 150 is less than a predetermined threshold, and updates the present bias value $G_{bias}(k)$ by using the presumed bias value.

Figure 4:
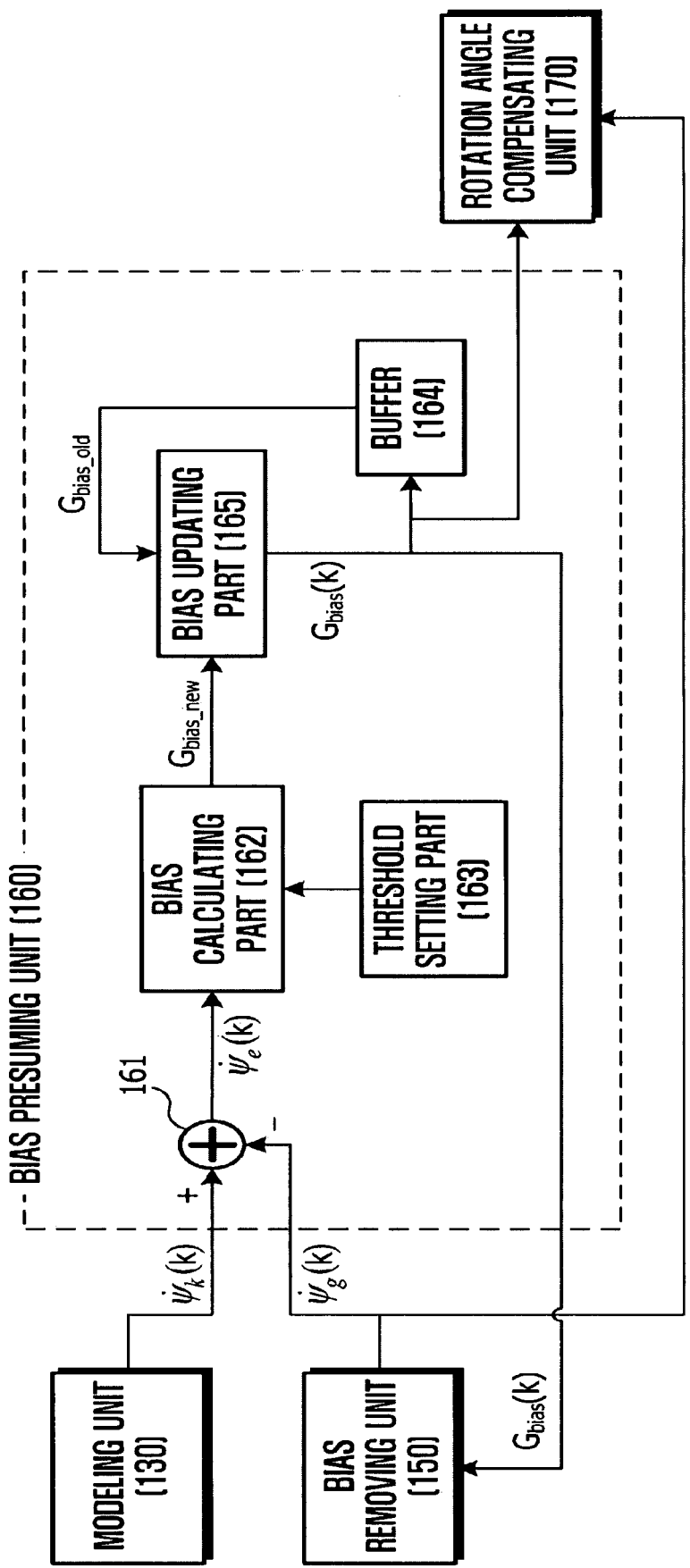
FIG. 4 is a block diagram showing the detailed configuration of a bias presuming unit.

FIG. 4 is a block diagram showing the detailed configuration of a bias presuming unit 160. For example, the bias presuming unit 160 includes a subtracter 161, a bias calculating part 162, a threshold setting part 163, a bias updating part 165, and a buffer 164.

The subtracter 161 subtracts the angular velocity $\dot{\psi}_g(k)$ supplied by the bias removing unit 150 from the angular velocity $\dot{\psi}_k(k)$, which is calculated by applying a robot model to the velocities of the wheels measured by the encoder 120. As a result, the subtracter 161 supplies the difference between the rotational angular velocities $\dot{\psi}_k(k)$ and $\dot{\psi}_g(k)$, that is, $\dot{\psi}_e(k)$ to the bias calculating part 162.

The bias presuming unit 160 determines (detects) a confidence range by using a difference value between the calculated angular velocity and the measured angular velocity. To do this, the bias calculating part 162 observes the magnitude of the difference $\dot{\psi}_e(k)$ and detects a range in which the magnitude of the difference $\dot{\psi}_e(k)$ is less than a predetermined threshold. That is, the bias calculating part 162 determines that the bias drift occurs in a range in which a representative value (average, intermediate value, mode, or the like) of errors between the rotational angular velocities $\dot{\psi}_k(k)$ and $\dot{\psi}_g(k)$ is less than a predetermined threshold so as to determine a confidence range in the plurality of time ranges. Further, the bias calculating part 162 calculates new bias values $G_{bias\_new}$ from the values of the difference $\dot{\psi}_e(k)$ in the confidence ranges. And, when the peak value of the calculated difference value is larger than a threshold in a determined confidence range, the bias calculating part 162 may exclude a corresponding confidence range from the final confidence range.

Figure 5:
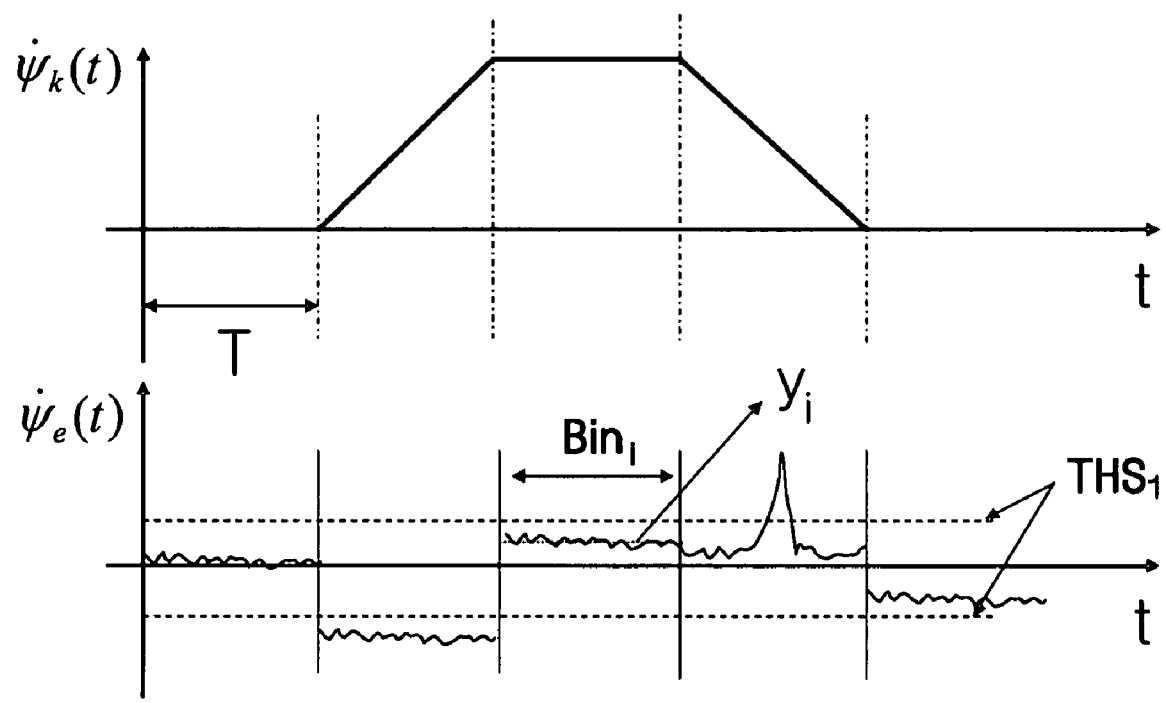
FIG. 5 is a view showing an example of a profile of an angular velocity when the mobile robot rotates.

FIG. 5 is a view showing an example of a profile of an angular velocity when the mobile robot rotates. Specifically, in FIG. 5, graphs show the variation of the rotational angular velocities $\dot{\psi}_k(k)$ and $\dot{\psi}_e(k)$ depending on the progress of time, and are compared with each other. Referring to the graph of the angular velocity $\dot{\psi}_k(k)$, it can be understood that the mobile robot 100 goes through a series of motions that includes stop, an accelerated motion, a uniformly accelerated motion, an accelerated motion, and stop. During the series of motions, the difference $\dot{\psi}_e(k)$ is irregularly displayed. For example, it is to be understood that the difference $\dot{\psi}_e(k)$ has a slightly small and uniform value in the range in which the mobile robot is stopped or moved with a uniform velocity, but the difference $\dot{\psi}_e(k)$ has an irregular value in the range in which the mobile robot is moved with an acceleration. This means that it is difficult to detect a reliable bias value due to the vibration of the robot body in the range in which the mobile robot is moved with an acceleration.

However, all of the motion ranges cannot be clearly divided into an accelerated motion range, a uniform velocity range, and a stop range. Accordingly, it is necessary to establish a standard for determining the range in which it is possible to detect a reliable bias value.

In the present embodiment, the entire time range is divided into time ranges having a predetermined width T (it is not necessary to divide the entire time range into same ranges), and a representative value $y_i$ of $|\dot{\psi}_e(k)|$ is calculated in each time range $Bin_i$. In this case, a range in which the representative value $y_i$ of $|\dot{\psi}_e(k)|$ is less than a predetermined threshold $THS_1$ is determined as a confidence range.

However, although an average is less than the threshold THS$_1$ in a predetermined time range, a peak value caused by a temporary disturbance may be included in the time range. For this reason, it may be insufficient to determine a confidence range using only representative value. Since the peak value may have an undesirable effect on the accurate presumption of the bias, the time range needs to be excluded from the final confidence range. Accordingly, another threshold THS$_2$ different from the threshold THS$_1$ is further set in the bias calculating part 162. In this case, if any one value in a certain range is larger than the threshold THS$_2$, the range may be excluded from the final confidence range.

Figure 6:
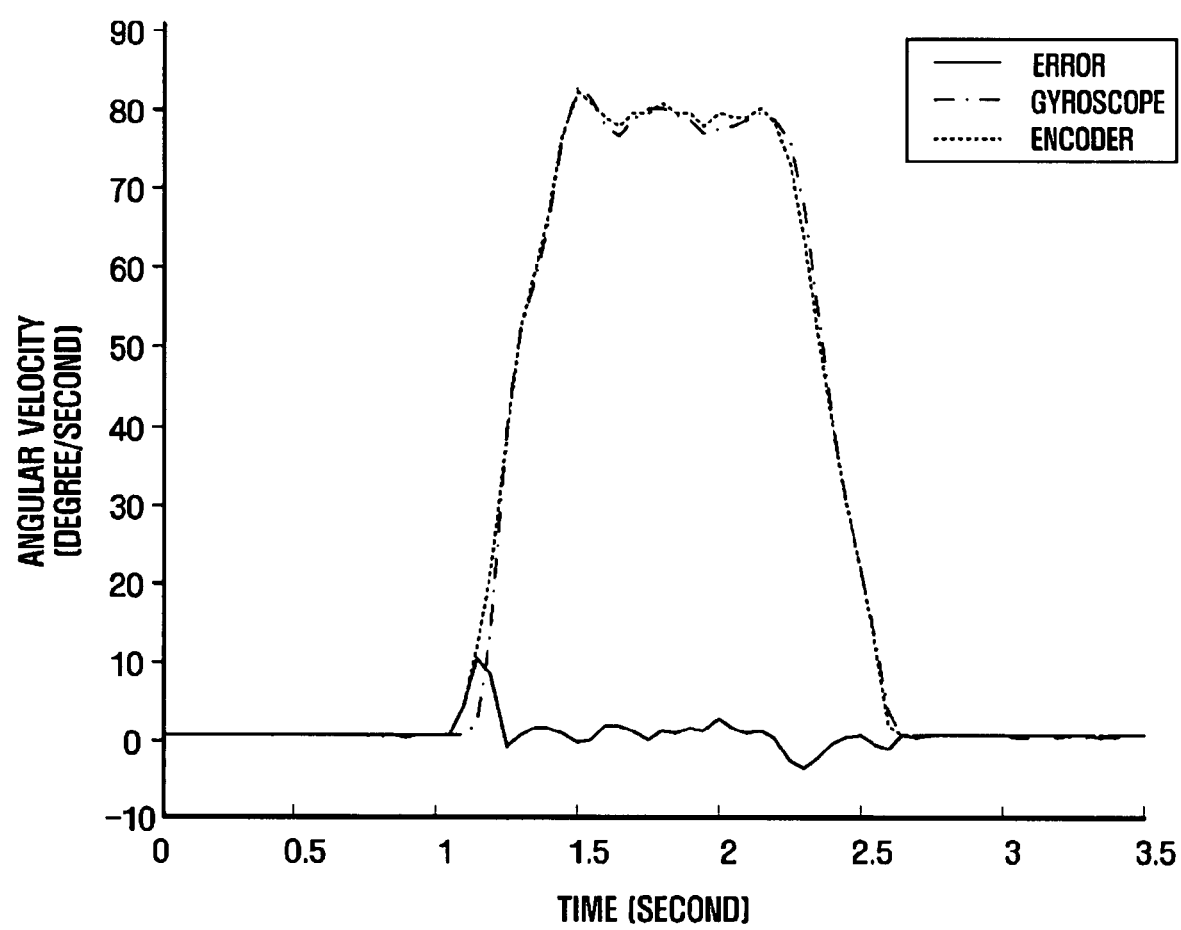
FIG. 6 is a graph showing an angular velocity measured by an encoder of the mobile robot, an angular velocity measured by a gyroscope, and an error between the angular velocities.

FIG. 6 is a graph showing an angular velocity measured by an encoder, an angular velocity measured by a gyroscope, and an error between the angular velocities in the mobile robot 100 of FIG. 1 that is actually moved. Referring to FIG. 6, the error has a small value in a range in which the mobile robot 100 is stopped, and the error has a relatively large value in a range in which the mobile robot 100 is moved by an acceleration. However, the bias calculating part 162 of FIG. 4 monitors only the change of an error and detects a confidence range irregardless of the type of the motion of the mobile robot 100. Accordingly, if any range suitable for presuming a bias exists during any motion of the mobile robot 100, it is possible to detect the range suitable for presuming a bias.

Finally, the bias calculating part 162 of FIG. 4 calculates a new bias value G$_{bias\_new}$ from the value of $\psi_e(k)$ in the detected confidence range. For example, the latest value of the representative values y$_i$ in the confidence range may be set as the new bias values G$_{bias\_new}$.

The threshold setting part 163 sets the thresholds THS$_1$ and/or THS$_2$ used in the bias calculating part 162. The thresholds may be set by a user, but may be actively provided to have proper values. For this reason, the threshold setting part 163 sets a threshold by the following method.

Assuming that the robot has been stopped for a sufficient period, the threshold setting part 163 stores the output value of the gyroscope 140 of FIGS. 1 and 3 when the robot is stopped. Before the robot is shipped as a product or when the robot is initialized to be used, the process for storing the output value may be performed in a factory. Then, Allan variance is calculated from the stored output value.

Figure 7:
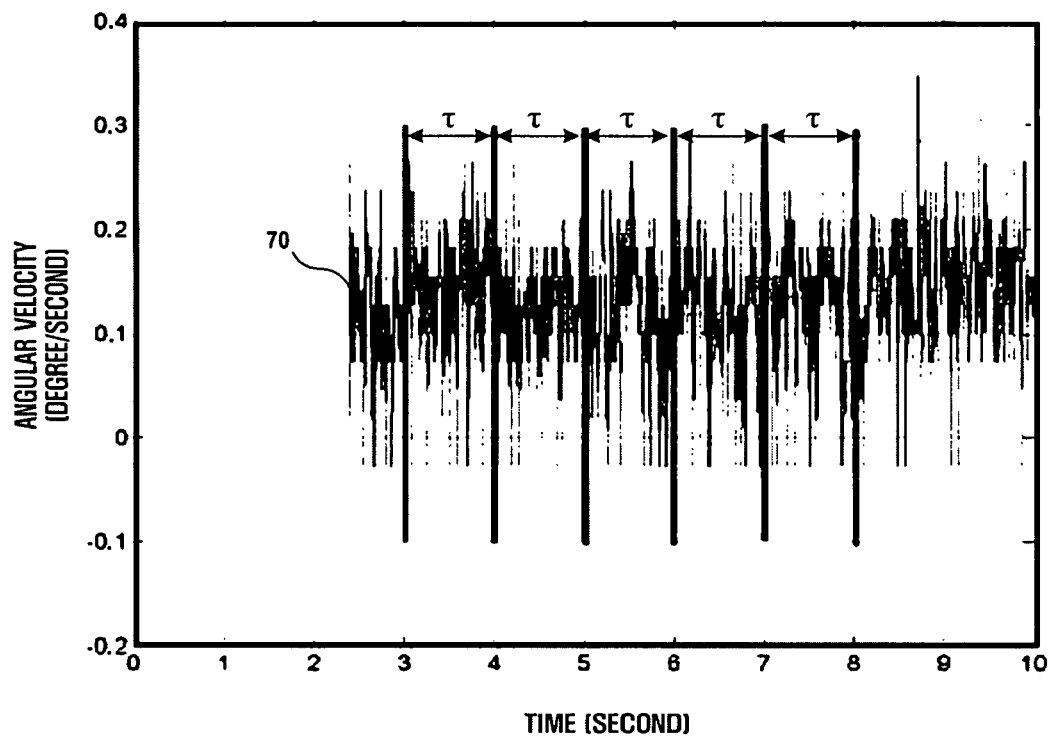
FIG. 7 is a graph showing variation in an output value of an angular velocity of the gyroscope when the mobile robot is stopped.

FIG. 7 is a graph 70 showing variation in an output value of an angular velocity of the gyroscope when the mobile robot is stopped. In FIG. 7, Allan variance AV(τ) calculated by a function of τ may be expressed as the following Expression 2:

EXPRESSION 2

$$AV(\tau) = \frac{1}{2(n-1)} \sum_t [\text{mean}(\tau)_{t+1} - \text{mean}(\tau)_t]^2.$$

Figure 8:
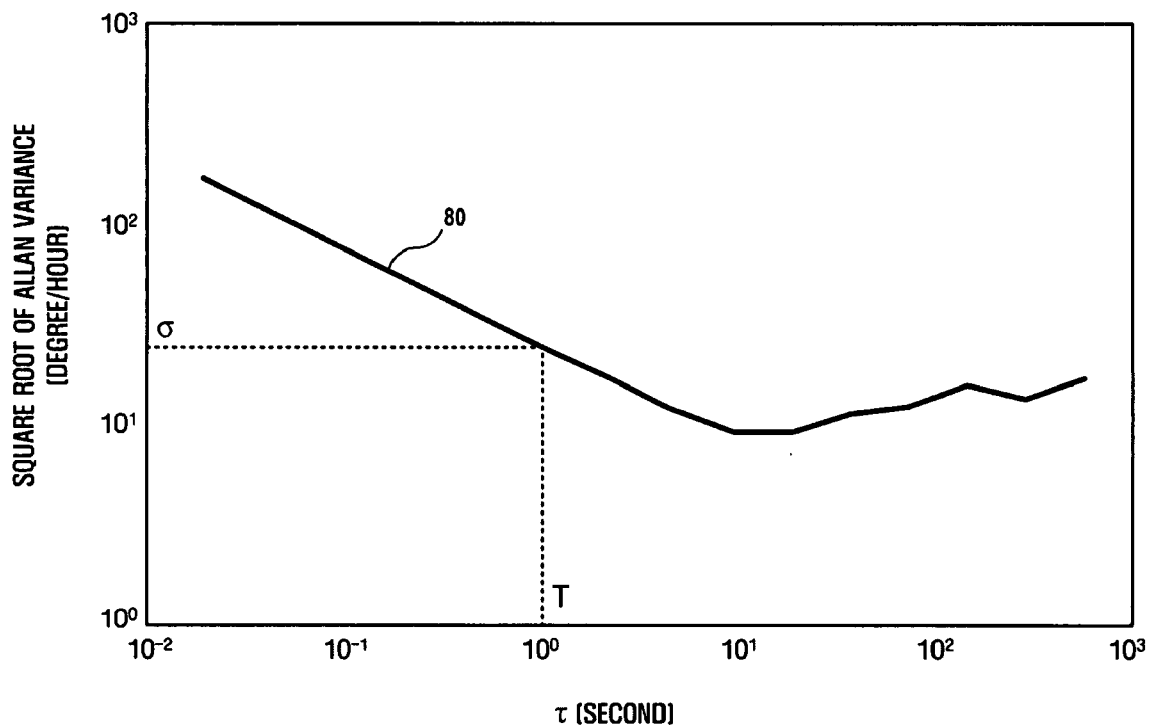
FIG. 8 is a graph showing an example of a square root of an Allan variance.

In this case, n indicates the number of ranges having an interval of τ, and mean(t)$_i$ indicates an average of an i-th range. FIG. 8 is a graph 80 showing an example of a square root of Allan variance based on the variation of τ. When the width T of the range set in FIG. 6 is read on the graph 80, it can be presumed how quickly the bias drift is changed. For example, when T is set to 1, σ is 15 deg./hr. That is, when a bias drifts, a variation of a standard deviation in a square root between the present range and the next range can be presumed as 15 deg./hr. A fact that a has a large value means that the bias drift is large, and a fact that (Y has a small value means that the bias drift is small. When a threshold is set on the move with reference to the value of σ, it is possible to more accurately determine a confidence range. For example, the thresholds THS$_1$ and THS$_2$ may be set as values that are obtained by multiplying the value of σ by a constant. In this case, a constant multiplied by the threshold THS$_2$ should be larger than a constant multiplied by the threshold THS$_1$.

The bias updating part 165 of FIG. 4 finally calculates a presumed bias value G$_{bias}$(k) by using a past bias value G$_{bias\_old}$ stored in the buffer 164 and a new bias value G$_{bias\_new}$ calculated by the bias calculating part 162. For example, the presumed bias value G$_{bias}$(k) may be calculated by the following Expression 3:

EXPRESSION 3

$$G_{bias}(k) = A \cdot G_{bias\_old} + (1-A) \cdot G_{bias\_new}, \text{ where } 0 \leq A \leq 1.$$

A weighted sum of a present bias value and a past bias value is calculated in Expression 3. As A becomes larger, the weighted sum becomes more sensitive to variation. As A becomes smaller, the weighted sum becomes more insensitive to variation. In the worst case, when A is zero, a new bias value may directly become a presumed bias value G$_{bias}$(k) irregardless of a past bias value.

The buffer 164 temporarily stores the presumed bias G$_{bias}$(k) updated by the bias updating part 165, and supplies the presumed bias G$_{bias}$(k) to the bias updating part 165 at the time of the next calculation of the bias updating part 165. In this case, the presumed bias G$_{bias}$(k) stored in the buffer 164 is supplied to the bias updating part 165 as the past bias value G$_{bias\_old}$.

Figure 9:
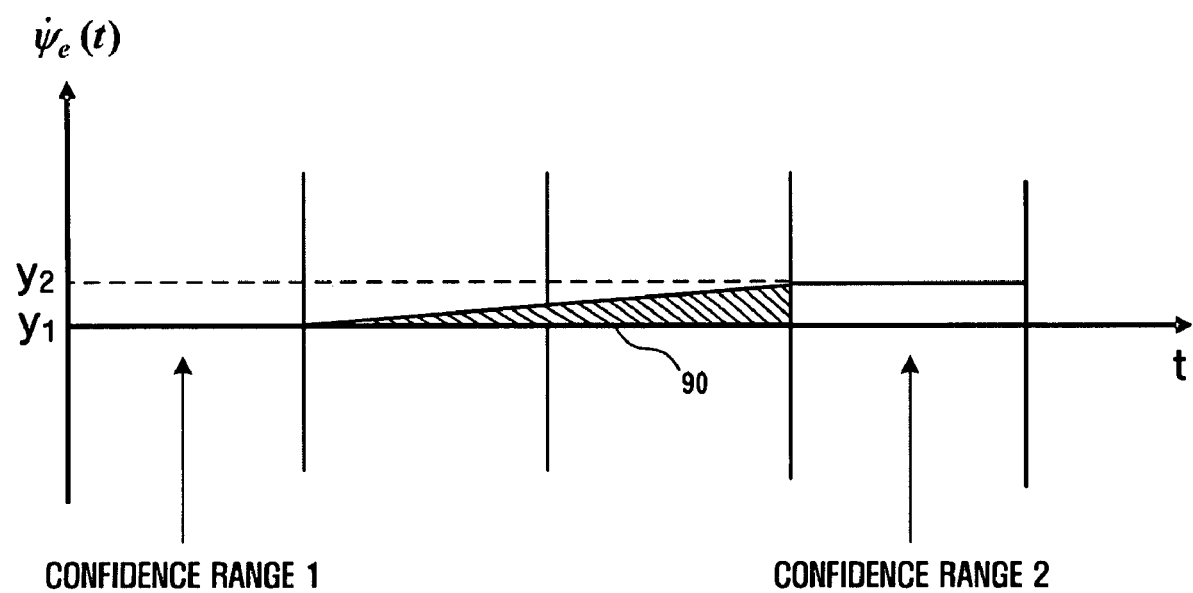
FIG. 9 is a view showing an accumulated error occurring in a range excluding confidence ranges.

Meanwhile, according to an embodiment of the invention, the present bias is frequently updated. However, an accumulated error may occur in the range excluding the confidence range, that is, between the point of time when the bias is previously updated and the point of time when the present bias is updated. Accordingly, the accumulated error needs to be compensated. The accumulated error is exemplified in FIG. 9. Referring to FIG. 9, the bias is updated in a confidence range 1 and a confidence range 2 by representative values y$_1$ and y$_2$, respectively. However, the accumulated error corresponding to a hatched area 90 may occur in two time intervals between the confidence range 1 and the confidence range 2. Therefore, the rotation angle compensating unit 170 of FIG. 4 compensates the accumulated error of the rotation angle occurring in the range excluding the confidence ranges. For example, the rotation angle compensating unit 170 can compensate the accumulated error on the basis of the following Expression 4. Expression 4 uses a linear interpolation between the representative values y$_1$ and Y$_2$.

EXPRESSION 4

$$\psi_{gc}(k) = \psi_g(k) - (y_1 - y_2) \times n \times T \times 0.5$$

Here, $\psi_g(k)$ indicates a rotation angle that is measured by the gyroscope and not compensated (that is, a value obtained by integrating $\psi_g(k)$ over time), $\psi_{gc}(k)$ indicates a rotation angle that is compensated by the rotation angle compensating unit 170. Further, n indicates the number of time ranges between the two confidence ranges, and T indicates a width T of a time range.

Each of the components, which have been described above, shown in FIGS. 1, 3, and 4 may be embodied by a task, class, sub-routine, process, object, execution thread, software such as a program, or hardware such as an FPGA (field-programmable gate array) and an ASIC (application-specific integrated circuit). The above-described components may be included in a storage medium that can be read by a computer, and a part of the components may be dispensed so as to be stored in a plurality of computers.

Figure 10:
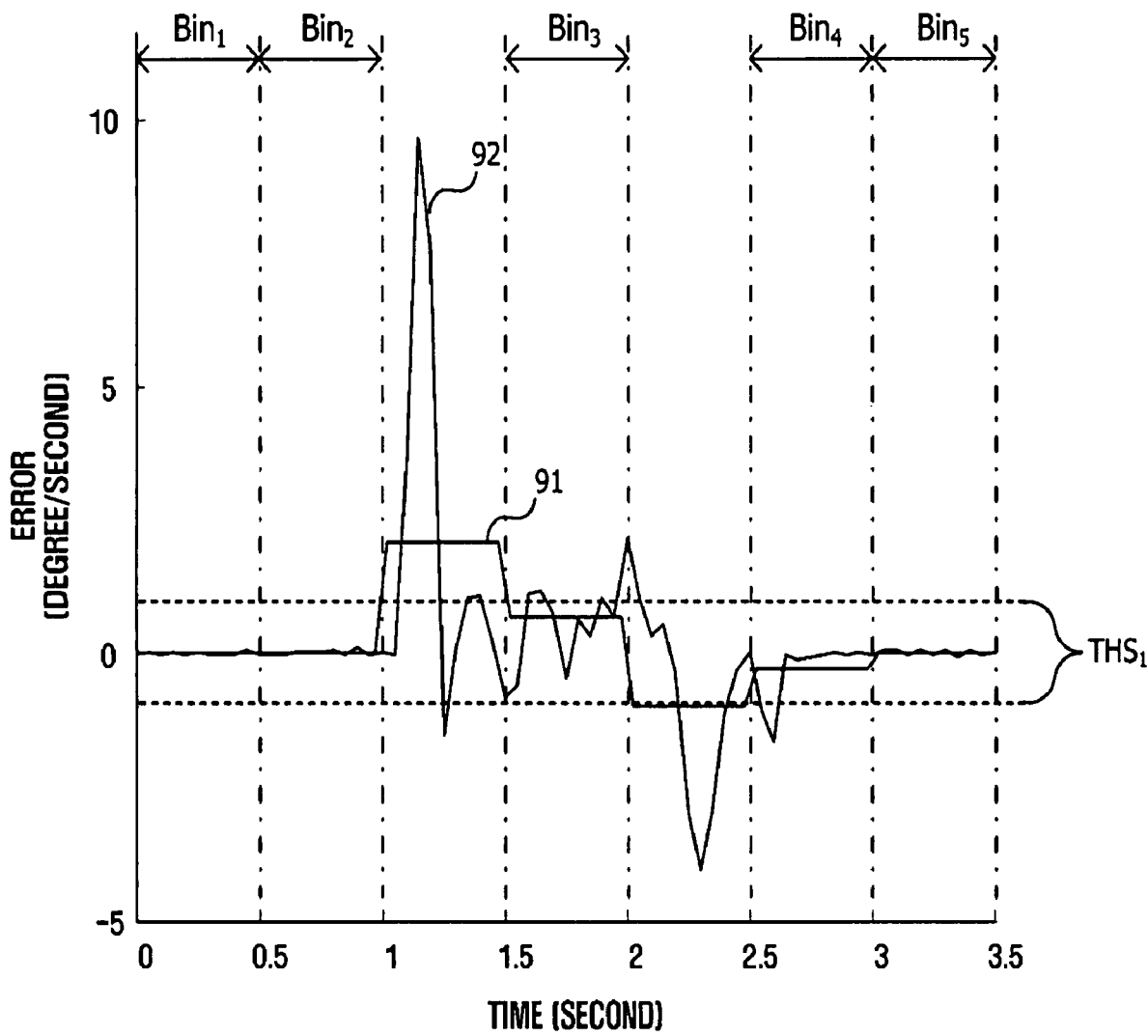
FIG. 10 is a view showing an example in which an entire range is divided to obtain confidence ranges.

FIG. 10 shows an example of an experiment in which the entire range is divided in an angular velocity graph such as FIG. 6. In FIG. 10, a graph 92 shows an instantaneous value of $\dot{\psi}_e(k)$, and a graph 91 shows a representative value $y_i$ of the instantaneous value in each range. In this experiment, the entire range is divided at an interval of 0.5 second, and $THS_1$ is set to ±1 degree/sec. ($THS_2$ is not used). Accordingly, five confidence ranges $Bin_1$ to $Bin_5$ are obtained. Further, even though the robot is moved, it is possible to compensate a bias on the move by using representative values $y_i$ of these confidence ranges.

Figure 11:
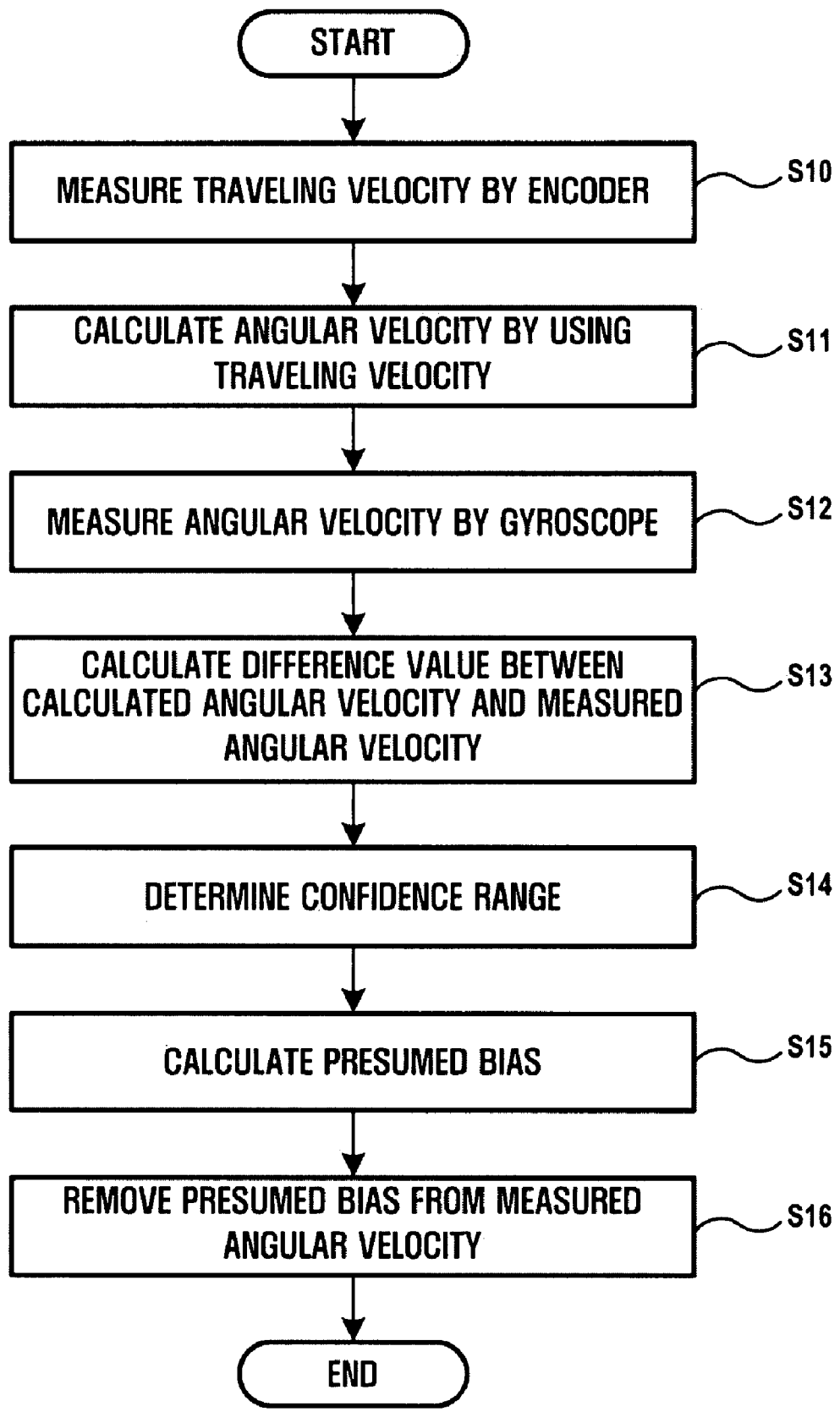
FIG. 11 is a flowchart illustrating a method of compensating a bias according to another embodiment of the present invention.

FIG. 11 is a flowchart illustrating a method of compensating a bias according to an embodiment of the invention. The method is described with concurrent reference to the apparatus of FIG. 1, for ease of explanation only.

First, the encoder 120 measures the traveling velocities of the wheels provided in the mobile robot 100 (S10).

The modeling unit 130 calculates the angular velocity of the mobile robot by using the measured traveling velocities (S11). Then, the gyroscope 140 detects the angular velocity of the mobile robot by using the rotational inertia of the mass (S12).

Next, the modeling unit 130 divides a difference value between the traveling velocities of the wheels by the distance between the wheels so as to calculate the angular velocity of the mobile robot (S13).

The bias presuming unit 160 determines (detects) a confidence range by using a difference value between the calculated angular velocity and the measured angular velocity (S14). For the purpose of this, the bias presuming unit 160 includes a subtracter 161 and a bias calculating part 162. The subtracter 161 calculates the difference value between the calculated angular velocity and the measured angular velocity. The bias calculating part 162 divides the observation time (including the time when the mobile robot is stopped and moved) into a plurality of time ranges. Then, the bias calculating part 162 compares a representative value (for example, average, intermediate value, mode, or the like) of the difference value calculated in a respective time range with a predetermined threshold $THS_1$ so as to determine a confidence range or ranges in the plurality of time ranges. After that, the bias calculating part 162 calculates the presumed bias by using the representative value in the determined time range. When the peak value of the calculated difference value is larger than the other threshold $THS_2$ in determined confidence range(s), the bias calculating part 162 may exclude a corresponding confidence range(s) from the final confidence range.

The bias presuming unit 160 may further include a threshold setting part 163 that sets the threshold by using the distribution of the output value of the gyroscope measured when the mobile robot is stopped.

The threshold setting part 163 calculates an Allan variance function by using the output value of the gyroscope, and sets the threshold by using a value that is obtained by inputting the width of the confidence range to the Allan variance function. In this case, the threshold setting part 163 may multiply the value obtained from the Allan variance function by a predetermined constant so as to set the threshold.

Meanwhile, the bias presuming unit 160 calculates the presumed bias by using a difference value in the confidence range among the difference values (S15). The bias presuming unit 160 may further include a bias updating part 165 that updates the present presumed bias by calculating a weighted sum of the calculated presumed bias and the past presumed bias. In addition, the bias presuming unit 160 may further include a rotation angle compensating unit 170 that calculates a bias in the range excluding the confidence range by interpolating the presumed biases.

Finally, the bias removing unit 150 removes the presumed biases from the angular velocity measured by the gyroscope (S16). For the purpose of this, the bias removing unit 150 includes a subtracter 151 that calculates a difference value between the calculated presumed bias and the output value of the gyroscope, and a multiplier 152 that multiplies the difference value by a predetermined scale factor.

In the following Table 1, an error when an offset (bias) is initially compensated once before the robot is moved are compared with an error when an offset (bias) is compensated during the movement of the robot according to the embodiment of the invention. The error in Table 1 means a difference between an offset measured by the gyroscope in accordance with bias compensation and an offset accurately calculated using another reference. In this experiment, an inexpensive MEMS gyroscope is used as the gyroscope, and the mobile robot 100 has reciprocated along a path of 2 m×2 m in zigzags. A total traveling distance of the mobile robot 100 is 72 m, and a total rotation angle is 5760 degrees.

TABLE 1

| No. | ERRORS WHEN OFFSETS ARE INITIALLY COMPENSATED ONE TIME | ERRORS WHEN OFFSETS ARE COMPENSATED ACCORDING TO THE PRESENT EMBODIMENT |
|---|---|---|
| 1 | 2.19 | 0.59 |
| 2 | 5.24 | 1.79 |
| 3 | 6.18 | 0.45 |
| 4 | 0.06 | 1.08 |
| 5 | 2.56 | 0.33 |
| 6 | 9.96 | 0.19 |
| 7 | 8.59 | 0.47 |
| 8 | 9.66 | 0.13 |
| 9 | 0.92 | 0.85 |
| 10 | 8.31 | 0.37 |
| 11 | 2.98 | 0.27 |
| 12 | 4.25 | 1.58 |
| 13 | 10.18 | 0.80 |
| 14 | 2.33 | 0.23 |
| 15 | 1.58 | 0.05 |
| AVERAGE | 5.00 | 0.61 |
| DEVIATION | 3.55 | 0.52 |

According to the experimental results shown in Table 1, it can be understood that an average of an angle error is reduced to 1/8.3 times and a standard deviation of the angle error is reduced to 1/6.8 times in the present invention.

According to an embodiment of the present invention, it is possible to compensate the gyroscope bias in real-time during the movement of the mobile robot. As a result, it is possible to reduce an accumulated error of measured values due to a difference that is increased as time goes by.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus correcting a bias of a gyroscope that is mounted on a mobile robot and that measures an angular velocity of the mobile robot, the apparatus comprising:

at least one encoder respectively measuring a traveling velocity of a respective at least one wheel of the mobile robot;

a modeling unit calculating an angular velocity of the mobile robot by using the measured traveling velocity;

a bias presuming unit determining a confidence range by using difference values between the calculated angular velocity and the measured angular velocity, and calculating a presumed bias by using a value in a confidence range among the difference values; and a bias removing unit removing the presumed bias from the measured angular velocity.

2. The apparatus of claim 1, further comprising a rotation angle compensating unit interpolating the calculated presumed bias so as to remove an accumulated error of a rotation angle occurring in a range excluding the confidence range.

3. The apparatus of claim 1, wherein the at least one wheel is at least two wheels, and wherein the modeling unit divides a difference value between the traveling velocities of the wheels by a distance between the wheels so as to calculate the angular velocity of the mobile robot.

4. The apparatus of claim 1, wherein the bias presuming part comprises a subtracter that calculates a difference value between the calculated angular velocity and the measured angular velocity, and a bias calculating part that divides an observation time into a plurality of time ranges, respectively compares a representative value of the difference value calculated in each respective time range with a predetermined threshold so as to determine a confidence range in the plurality of time ranges, and calculates a presumed bias by using the representative value in the determined time range.

5. The apparatus of claim 4, wherein the representative value is an average, intermediate value, or mode.

6. The apparatus of claim 4, wherein the observation time is a time when the mobile robot is stopped and moved.

7. The apparatus of claim 4, wherein, when a peak value of the calculated difference value is larger than another threshold in the determined confidence range, the bias calculating part excludes a corresponding confidence range from the final confidence range.

8. The apparatus of claim 4, wherein the bias presuming unit comprises a threshold setting part that sets the threshold by using a distribution of an output value of the gyroscope when the mobile robot is stopped.

9. The apparatus of claim 8, wherein the threshold setting part calculates an Allan variance function by using the output value of the gyroscope, and sets the threshold by using a value that is obtained by inputting a width of the determined confidence range into the Allan variance function.

10. The apparatus of claim 9, wherein the threshold setting part multiplies the value obtained from the Allan variance function by a predetermined constant so as to set the threshold.

11. The apparatus of claim 9, wherein the bias presuming unit further comprises a bias updating part that updates a present presumed bias by calculating a weighted sum of the calculated presumed bias and a past presumed bias.

12. The apparatus of claim 1, wherein the bias removing unit comprises a subtracter calculating a difference value between the calculated presumed bias and the output value of the gyroscope, and a multiplier multiplying the difference value by a predetermined scale factor.

13. A method implemented by at least one hardware processor of correcting a bias of a gyroscope that is mounted on a mobile robot and that measures an angular velocity of the mobile robot, the method comprising:

measuring a traveling velocity of at least one respective wheel of the mobile robot;

calculating an angular velocity of the mobile robot by using the measured at least one traveling velocity;

determining a confidence range by using difference values between the calculated angular velocity and the measured angular velocity;

calculating a presumed bias by using a value in a confidence range among the difference values; and removing the presumed bias from the measured angular velocity.

14. The method of claim 13, wherein the calculating an angular velocity further comprises calculating the angular velocity of the mobile robot by dividing a difference value between the travel velocities of the wheels by a distance between the wheels.

15. The method of claim 13, wherein:

the determining of the confidence range comprises calculating a difference value between the calculated angular velocity and the measured angular velocity, dividing an observation time into a plurality of time ranges, and respectively comparing a representative value of the difference value calculated in each respective time range with a predetermined threshold so as to determine a confidence range in the plurality of time ranges; and the calculating a presumed bias comprises calculating a presumed bias by using the representative value in the determined time range.

16. The method of claim 15, wherein the representative value is an average, intermediate value, or mode.

17. The method of claim 15, wherein the observation time is the time when the mobile robot is stopped and moved.

18. The method of claim 15, wherein the determining a confidence range further comprises excluding a corresponding confidence range from the final confidence range when a peak value of the calculated difference value is larger than another threshold in the determined confidence range.

19. The method of claim 15, wherein the determining a confidence range comprises setting the threshold by using the distribution of the output value of the gyroscope measured when the mobile robot is stopped.

20. The method of claim 19, wherein the setting a threshold comprises calculating an Allan variance function by using the output value of the gyroscope, and setting the threshold by using a value that is obtained by inputting a width of the confidence range into the Allan variance function.

21. The method of claim 20, wherein the threshold is set to a value that is obtained by multiplying the value obtained from the Allan variance function by a predetermined constant.

22. The method of claim 15, wherein the calculating a presumed bias further comprises updating a present presumed bias by calculating a weighted sum of the calculated presumed bias and a past presumed bias.

23. The method of claim 13, wherein the removing a presumed bias comprises calculating a difference value between the calculated presumed bias and the output value of the gyroscope, and multiplying the difference value by a predetermined scale factor.

24. An apparatus correcting an offset value of a gyroscope of a mobile robot in real-time during movement of the mobile robot, comprising:

a modeling unit calculating a calculated angular velocity of the mobile robot using a measured traveling velocity of each wheel of the mobile robot;

a bias removing unit correcting for a bias offset in a measured angular velocity of the mobile robot measured by the gyroscope, the bias removing unit generating a corrected measured angular velocity by removing a presumed bias from the measured angular velocity; and a bias presuming unit calculating the presumed bias value using a confidence range in which a difference between the calculated angular velocity and corrected measured angular velocity is less than a threshold, the confidence range determined using difference values between the calculated angular velocity and the measured angular velocity.

25. The apparatus of claim 24, wherein the modeling unit receives a linear velocity of each wheel and calculates the angular velocity in a rotation angle obtainable by integrating the measured angular velocity.

26. The apparatus of claim 24, wherein the bias presuming unit comprises a bias updating part that calculates the presumed bias value using a past bias value and a new bias value calculated by the bias presuming unit, the presumed bias value calculable by the following expression $$G_{bias}(k)=A \cdot G_{bias\_old}+(1-A) \cdot G_{bias\_new}, \text{ and}$$

wherein $0 \leq A \leq 1$, and wherein $G_{bias\_old}$ is the past bias value, $G_{bias\_new}$ is a new bias value, and $G_{bias}(k)$ is the calculated presumed bias value.

27. The apparatus of claim 26, further comprising a rotation angle compensating unit compensating for accumulated error of a rotation angle occurring between updates of the bias value on the basis of the following expression $$\psi_{gc}(k)=\psi_g(k)-(y_1-y_2) \times n \times T \times 0.5,$$

wherein, $\psi_g(k)$ is the rotation angle of the mobile robot measured by the gyroscope, $\psi_{gc}(k)$ is a compensated rotation angle, n is a number of time ranges between two confidence ranges, and T is a width of a time range.

28. A method of compensating, in real-time, for bias drift of a gyroscope mounted in a mobile robot, during the movement of the mobile robot, the method comprising:

calculating a calculated angular velocity of the mobile robot using a measured traveling velocity of each wheel of the mobile robot;

correcting for a bias offset in a measured angular velocity of the mobile robot measured by the gyroscope, the bias removing unit generating a corrected measured angular velocity by removing a presumed bias from the measured angular velocity; and calculating the presumed bias value using a confidence range in which a difference between the calculated angular velocity and corrected measured angular velocity is less than a threshold, the confidence range determined using difference values between the calculated angular velocity and the measured angular velocity.

* * * * *